(12) United States Patent
Koljonen

(10) Patent No.: US 7,629,897 B2
(45) Date of Patent: Dec. 8, 2009

(54) ORALLY MOUNTED WIRELESS TRANSCRIBER DEVICE

(76) Inventor: Reino Koljonen, 722 Ridge Rd., Apt. 11, Lantana, FL (US) 33462-1528

( * ) Notice: Subject to any disclaimer, the term of this patent is extended or adjusted under 35 U.S.C. 154(b) by 341 days.

(21) Appl. No.: 11/584,146

(22) Filed: Oct. 20, 2006

(65) Prior Publication Data
US 2007/0105072 A1 May 10, 2007

(51) Int. Cl.
G09B 21/00 (2006.01)
G08B 1/08 (2006.01)
G08B 23/00 (2006.01)
H04B 1/034 (2006.01)
H04M 1/00 (2006.01)
H03K 17/94 (2006.01)

(52) U.S. Cl. ............... 340/825.19; 340/539.1; 340/573.1; 455/100; 455/575.6; 341/21

(58) Field of Classification Search ......... 340/539.1, 340/825.19, 573.1; 600/393, 590, 546, 373; 455/100; 341/21

See application file for complete search history.

(56) References Cited

U.S. PATENT DOCUMENTS

| | | | | |
|---|---|---|---|---|
| 5,212,476 A | * | 5/1993 | Maloney | 340/825.19 |
| 5,233,662 A | * | 8/1993 | Christensen | 381/70 |
| 5,245,592 A | * | 9/1993 | Kuemmel et al. | 368/107 |
| 5,689,246 A | * | 11/1997 | Dordick et al. | 340/825.19 |
| 6,108,592 A | * | 8/2000 | Kurtzberg et al. | 701/1 |
| 6,598,006 B1 | * | 7/2003 | Honda et al. | 702/116 |
| 6,971,993 B2 | * | 12/2005 | Fletcher | 600/587 |
| 7,024,228 B2 | * | 4/2006 | Komsi et al. | 455/566 |
| 7,072,443 B2 | * | 7/2006 | Schick et al. | 378/98.8 |
| 7,334,726 B2 | * | 2/2008 | Dulgerian et al. | 235/382 |
| 7,463,929 B2 | * | 12/2008 | Simmons | 607/58 |
| 7,509,499 B2 | * | 3/2009 | von Mueller et al. | 713/185 |
| 2004/0006699 A1 | * | 1/2004 | von Mueller et al. | 713/185 |
| 2004/0202344 A1 | * | 10/2004 | Anjanappa et al. | 381/364 |
| 2005/0015115 A1 | * | 1/2005 | Sullivan et al. | 607/5 |
| 2005/0114129 A1 | * | 5/2005 | Watson et al. | 704/235 |
| 2005/0164648 A1 | * | 7/2005 | Gannholm | 455/84 |
| 2008/0097221 A1 | * | 4/2008 | Florian | 600/476 |

* cited by examiner

Primary Examiner—Daniel Wu
Assistant Examiner—Fekadeselassie Girma
(74) Attorney, Agent, or Firm—Robert M. Downey, PA

(57) ABSTRACT

A wireless electronic device transcribes spoken words into text for input on an electronic device such as, but not limited to, a computer, cell phone, handheld computer, Blackberry or vehicle navigation system. The wireless transcriber device mounts within the oral cavity, preferably to the back side of a tooth, and detects vibration of the tooth and/or palate bone structure as the wearer of the device speaks. The sensed vibrations are converted to digital signals for wireless transmission to the electronic device. The electronic device receives the signals and captures the digital data containing the sensed vibrations. A software program in the electronic device reads the vibration data and converts the vibration data to text for input on the electronic device. The input text can be used for various purposes such as to create a document, fill in a form, send a text message or to give an operational command to the electronic device.

8 Claims, 2 Drawing Sheets

ORALLY MOUNTED WIRELESS TRANSCRIBER DEVICE

BACKGROUND OF THE INVENTION

1. Field of the Invention

This invention relates generally to a transcriber system for converting speech into text and, more particularly, to a wireless transcriber system that senses vibrations as a person speaks, transmits a signal to a receiver containing vibration data and converts the vibration data into text for input on an electronic device.

2. Discussion of the Related Art

There are many instances wherein it is necessary to transcribe spoken words into text. Traditionally, transcription has been used to record a printed text record of a conversation or testimony, such as in a disposition or court proceeding. Transcription has also been used extensively in office environments to generate a letter or document. This has been accomplished by dictation, wherein a secretary would take short hand notes and convert that to a typed text document or letter. Dictation is also accomplished with the use of a tape recorder and tape playback transcriber device, wherein a secretary listens to the recorded tape and types the spoken words to produce a document. More recently, voice recognition technology has evolved, allowing a person to speak into a microphone connected to an electronic device. Voice recognition software in the device recognizes the spoken words and converts the spoken words into either text, an electronic voice or an input command, such as in an automated telephone system.

As noted above, the various transcription techniques and systems used to date require either a skilled professional (i.e. stenographer, secretary) or a microphone device to receive the spoken words. The use of a skilled professional for transcription is costly and not always practical, such as when traveling or performing tasks outside of an office environment. Transcription performed by reception of voice through a microphone coupled with voice recognition software in an electronic device has become commonplace, particularly in telecommunication technology. However, use of microphones to receive voice signals is subject to interference with external noise which reduces the accuracy of the transcription. More specifically, once voice signals leave a person's mouth, they are subject to interference with other noise signals in the surrounding atmosphere. A microphone will receive all noise signals within the vicinity of the microphone and, depending upon the noise signal strength, the voice signals received in the microphone may be distorted to varying extents.

Ideally, voice signals should be captured within the oral cavity to avoid signal interference with ambient noise. This can be achieved by detection of vibrations within the oral cavity resulting from the speaker's voice signals impacting bone and tooth structure. As a person speaks, the teeth and certain bones surrounding the oral cavity vibrate. The vibrations are consistent with the tone and pitch of the voice. Thus, each time a person speaks a particular word, the tone and pitch associated with the pronunciation of that word generates a distinct and highly recognizable vibration in the teeth and bone structure surrounding the oral cavity. Sensing this vibration is an extremely accurate method for electronically transcribing spoken words.

In the past, detection of bone vibration has been used in hearing aid technology. An example of a hearing aid device using this technology is disclosed in U.S. Pat. No. 6,408,081 to Boesen. Specifically, this patent discloses a bone conduction voice transmission apparatus and system that contacts a portion of the external auditory canal to convert bone vibrations of voice sound information into electronic signals. The device also uses an air conduction sensor within the auditory canal which converts air vibrations of the voice sound information into electronic signals. A speech processor samples output from the bone conduction sensor and the air conduction sensor to filter noise and selects a pure voice sound signal for transmission.

In view of the foregoing, there remains a need for a wireless electronic transcription device which detects vibrations in the teeth or bone structure surrounding the oral cavity, and which sends a wireless signal to a receiver for converting the vibration data into text for input on an electronic device in order to create a document, complete a form, send a text message or give an operational command to the electronic device.

OBJECTS OF THE INVENTION

It is a primary object of the present invention to provide a wireless electronic transcription device that mounts within the oral cavity, such as to the back side of one or more teeth, and which detects vibration of tooth and/or bone structure as the user speaks, and further wherein the device transmits the wireless signal containing the sensed vibration data to an electronic device, that converts the vibration data into text for input on the electronic device.

It is a further object of the present invention to provide a wireless electronic transcription device which senses vibrations in the oral cavity as the user speaks and, wherein the vibration data is transmitted to an electronic device and converted to text for input to create a document, fill in a form, send a text message (e.g. Instant Message, email, etc.) or to give an operational command to the electronic device (e.g. to operate a navigational system in an automobile).

It is a further object of the present invention to provide a wireless electronic transcription device, as described above, and wherein the device transmits a coded signal with the vibration data to identify the user so that the electronic device receiving the vibration data recognizes and identifies the user from whom the signals originated, thereby acknowledging the identity of the speaker.

It is a further object of the present invention to provide a wireless electronic transcription device which is adapted to sense vibrations within the oral cavity as the user speaks, and wherein the device transmits a wireless signal containing the vibration data to an external electronic device for text input of the user's spoken words, and wherein the external electronic device may include a computer, cell phone, Blackberry, hand-held computer, vehicle navigation system or other electronic device that accepts input.

It is still a further object of the present invention to provide a wireless electronic transcription device, as set forth above, and wherein the device can be used to record a conversation or meeting of a plurality of individuals, and further wherein the wireless signals containing vibration data of each person are coded to enable identification of each speaker so that the words spoken by each person are identified to that person and recorded as text.

It is still a further object of the present invention to provide a wireless electronic transcription device, as described above, and wherein the orally mounted device sends a coded wireless signal allowing the external electronic device to determine the presence of the user within the vicinity of the electronic device, and wherein the electronic device (e.g. cell phone, computer, etc.) is enabled only when the user/owner of the electronic device is detected within the vicinity (i.e. predetermine range), so that if the user/owner is away from the electronic device, the electronic device remains in a lock-out-mode preventing unauthorized access to the user's private information and operation of the device.

It is still a further object of the present invention to provide a wireless electronic transcriber device which adapted for use in a computer network system, such as a reservation system, and wherein the computer system recognizes the speech of the person making a reservation (via the coded voice vibration signal).

It is still a further object of the present invention to provide a wireless electronic transcription device which detects vibrations in the tooth and/or bone structure of the oral cavity resulting from the person's speech, and wherein the device transmits a coded wireless signal containing the sensed vibration data for receipt by an electronic system that is adapted to recognize the user and the words spoken by the user.

It is still a further object of the present invention to provide an orally mounted wireless electronic transcription device which is adapted to monitor certain bodily functions, including blood levels and heart rate, for wireless transmission to an external electronic device.

It is still a further object of the present invention to provide an orally mounted wireless electronic transcription device which is adapted to detect blood alcohol levels in the user for transmission to an external electronic device.

These and other objects of the invention are more readily apparent with reference to the drawings and accompanying detailed description.

SUMMARY OF THE INVENTION

The present invention is directed to a wireless electronic device that transcribes spoken words into text for input on an electronic device such as, but not limited to, a computer, cell phone, handheld computer, Blackberry or vehicle navigation system. The wireless transcriber device mounts within the oral cavity, preferably to the back side of a tooth, and detects vibration of the tooth and/or palate bone structure as the wearer of the device speaks. The sensed vibrations are converted to digital signals for wireless transmission to the electronic device. The electronic device receives the signals and captures the digital data containing the sensed vibrations. A software program in the electronic device reads the vibration data and converts the vibration data to text for input on the electronic device. The input text can be used for various purposes such as to create a document, fill in a form, send a text message or to give an operational command to the electronic device.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
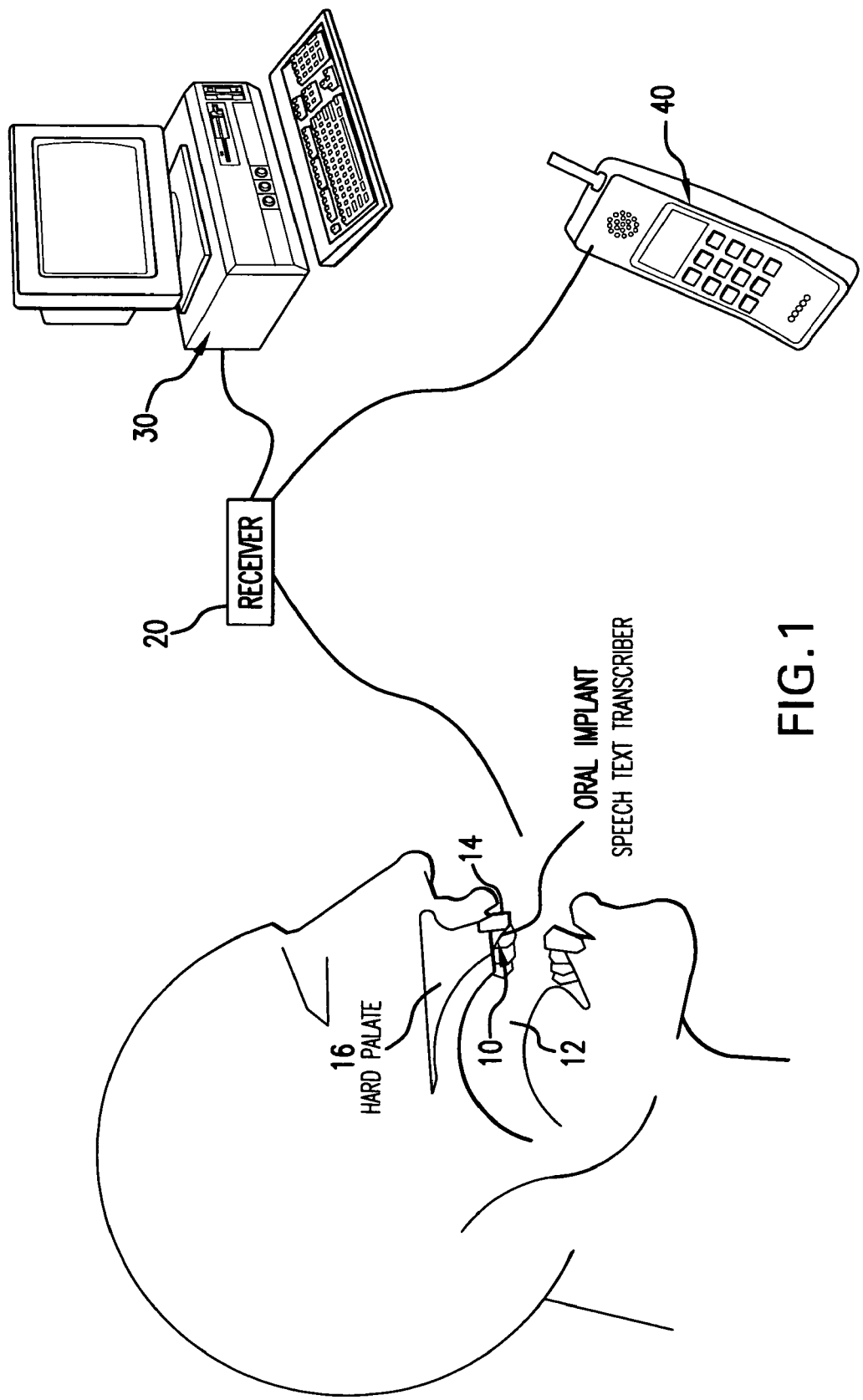
FIG. 1 is a diagram illustrating wireless transmission of vibration data from an orally mounted device to a receiver in one or more external electronic devices for input of text or operational commands.
Figure 2:
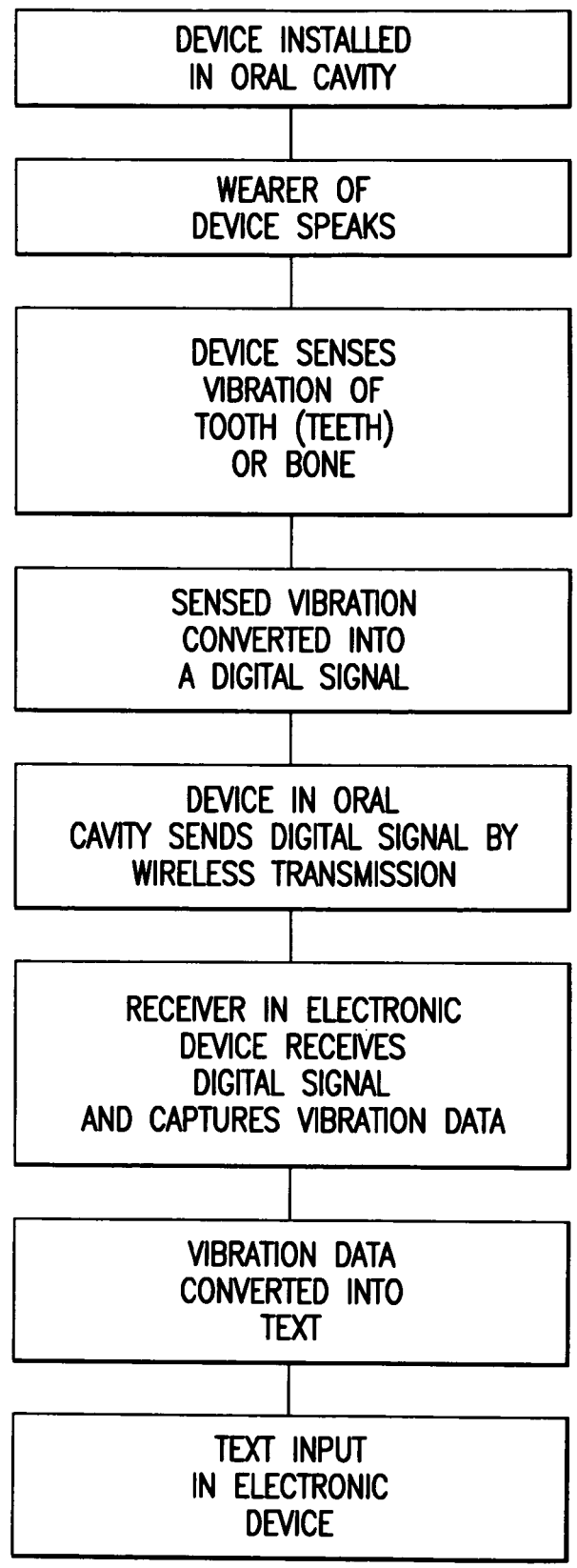
FIG. 2 is a block diagram showing the operational sequence of the orally mounted wireless transcription device of the present invention, in accordance with a preferred embodiment thereof.

Referring to FIGS. 1 and 2, the orally mounted wireless electronic transcriber device is shown and generally indicated as 10. More particularly, the system configuration is shown in FIG. 1 and sequence of operation of the device and system is shown in the block diagram of FIG. 2.

The invention uses an oral implant device 10 which mounts within the oral cavity, preferably behind one or more teeth, as seen in FIG. 1. The oral implant device 10 is structured and disposed to detect vibrations that occur in the teeth and/or bone structure surrounding the oral cavity. In a preferred embodiment, the oral implant device 10, mounted to the back side of a tooth, as shown in FIG. 1, detects vibration of that tooth and/or the hard palate bone above the oral cavity 12. In a preferred embodiment, the device 10 is bonded to the rear side of the tooth with a suitable dental bonding agent. Alternatively, the device 10 maybe clipped to the tooth, allowing removal by the user. In yet a further embodiment, the device 10 can be attached to dentures or in an area where a tooth has been removed.

In operation, the device 10 senses vibration of the tooth 14 and/or palate bone structure 16 as the user speaks. The sensed vibrations are converted to digital data which is carried in a wireless signal transmitted by the device 10. A receiver 20 receives the signal containing the vibration data for use in an electronic device such as, but not limited to, a computer 30 or cellular telephone 40. In a preferred embodiment, the receiver 20 is provided as an internal component within the electronic device (e.g. computer 30, cellular telephone 40). The electronic device 30, 40 is provided with a software program which is adapted to read the digital vibration data and convert the vibration data into text that replicates the words spoken by the user. More particularly, the software converts the data that was originally generated by the spoken words of the user back into those exact words for use in operation of the electronic device to produce a word document, send a text message, complete a form, perform input functions, and/or to perform input commands for operating various functions of the device 30, 40.

In a preferred embodiment, the signal transmitted by the oral implant device 10 and carrying the vibration data may further carry a code which specifically identifies the implant device 10 and, thus, the person wearing the device 10. This allows the receiving electronic device, such as the computer 30, cellular telephone 40, or other electronic device or system to identify the person speaking. This is useful for identifying each individual in a multiparty conversation, allowing the words spoken by each person to be identified and associated with that particular person.

Use of the coded signal and identification by the receiving electronic device or system also allows for enhanced security and convenience when the user communicates with a system, such as hotel reservation system. For instance, in a computer network, such as the INTERNET, members of an online service or system may have their user code stored in the system. When the user (wearer of the device 10) speaks on the phone or by Internet online voice connection, the remote third party computer system recognizes the user's code and instantly identifies the user. Thus, for example, when a user is making hotel reservations via a voice connection, the hotel computer recognizes the person by the coded signal transmitted by the device in the user's mouth. The system can then retrieve the user's address, telephone number and other user specific data. In a hotel accommodation system, room key access may also be controlled by the coded signal. For instance, when the user approaches their hotel room door, the electronic lock device on the door, equipped with a receiver, receives the coded signal transmitted by the device 10 in the user's mouth and recognizes the person as the authorized room occupant/hotel guest. The electronic lock system on the door is then released, allowing the user to enter their room. The electronic hotel room lock system may also be equipped to require a specific voice command from the user (e.g. open) to unlock the door and allow access. This same system can be used for home or business access entry. Alternatively, the electronic lock system on the door can be equipped with a touch sensor adapted to sense the pulse of a person grasping the door handle. Likewise, the implant device 10 in the user's mouth can be adapted to sense bodily functions, including pulse rate. In this example, the electronic lock system (e.g. hotel, home, business, etc.) can sense the user's pulse, when grasping the door handle, and match that sensed pulse with the sensed pulse of the oral implant device 10 that is transmitted to the receiver and the electronic door lock system. If the pulse readings match, the electronic lock device releases, allowing the user to enter through the door. In the example of a hotel, the system may further be equipped to assist a person who is lost in the hotel. For instances, if a person (i.e. hotel guest) forgets their room number and they try to open the wrong hotel room door, after several attempts the electronic system on the door will send a message to the front desk or security notifying the hotel personnel that the guest is attempting to enter the wrong room. A hotel employee can then be sent to that floor to assist the person in locating their room. This system is also useful to recognize attempted hotel room burglaries, notifying security of the attempted unauthorized entry into a room. The electronic lock sensor system on the hotel room door can be connected to security cameras, allowing hotel security to view and record the attempted entry.

The device 10 and system of the present invention may further be equipped to recognize the specific user of the device by voice signature. Similar to a fingerprint or DNA, a person's voice signature is distinct and can be recognized by the device. Therefore, if the device is removed from the user's mouth and installed in another person's mouth, the device will instantly recognize that the vibration of the tooth or bone structure does not match with the authorized user's voice. The implant device 10 and/or software in the receiving electronic device 30, 40 will determine that the voice signature is not the authorized user and will ignore any signals, commands or input from the unauthorized user wearing the implant device 10.

Use of a coded signal also allows for enhanced security measures, such as at an airport. Specifically, when passing through security, the user's voice signature can be matched for authorization along with the coded signal to determine that the passenger attempting to pass through security is, in fact, the authorized passenger that purchased the airline ticket.

The implant device 10 can also be equipped to measure bodily functions, such as blood levels. In particular, the device can be equipped to measure blood alcohol level and to send a coded signal to a device indicating the user's blood alcohol level. In this instance, a device installed in the user's vehicle may receive readings of blood alcohol levels and advise the user/driver to avoid driving in the event the driver's blood alcohol level is above a legal level.

Use of a coded signal transmitted by the implant device 10 also allows for user control of specific devices such as a cell phone, computer, vehicle navigation system and the like. The receiving electronic device (e.g. cell phone, computer, navigation system) can be equipped to recognize the coded signal and only enable activation and/or operation if the authorized user is in the vicinity of the device. Therefore, if the user/owner of the electronic device is away from the electronic device and another person attempts to activate and/or operate the electronic device, the electronic device will recognize that the person is not authorized and go into a lock-out-mode so that the unauthorized person is prevented from operating and accessing private information on the electronic device.

While the present invention has been shown and described in accordance with preferred and practical embodiments thereof, it is recognized that departures from the instant disclosure are contemplated within the spirit and scope of the present invention.

What is claimed is:

1. A personal user recognition system comprising:
    an oral implant device adapted for attachment within a user's oral cavity, and said oral implant device being structured and disposed to sense vibrations within the oral cavity as the user speaks, and said oral implant device being further structured and disposed for converting the sensed vibrations into digital vibration data and for transmitting said digital vibration data along with a user identifying code externally of the oral cavity in wireless signals;
    a receiver structured and disposed for receiving the wireless signals and the user identifying code transmitted by one or more of a plurality of said oral implant devices; and
    an electronic device communicating with the receiver and being structured and disposed for reading the digital vibration data along with the code identifying the user transmitted by one or more of said plurality of oral implant devices for identifying each user and for converting the digital vibration data of each identified user into text that replicates and distinguishes the words spoken by each identified user, and said electronic device being further structured and disposed for comparing the received digital vibration data to a known authorized user voice signature to confirm that the user is an authorized user.

2. The system as recited in claim 1 wherein the text converted from said digital vibration data is used to produce a document.

3. The system as recited in claim 1 wherein the text converted from said digital vibration data is used as an input command for operating a device.

4. A personal user recognition system comprising:
    an oral implant device adapted for attachment within a user's oral cavity, and said oral implant device being structured and disposed to sense characteristics of the user, including vibrations within the oral cavity when the user speaks, and said oral implant device being further structured and disposed for converting the sensed characteristics of the user into digital data and for transmitting said digital data along with a user identifying code externally of the oral cavity in wireless signals;
    a receiver structured and disposed for receiving the wireless signals and the user identifying code transmitted by one or more of a plurality of said oral implant devices; and
    an electronic device communicating with the receiver and being structured and disposed for reading the digital data along with the user identifying code transmitted by one or more of said plurality of oral implant devices for identifying each user.

5. The system as recited in claim 4 wherein said electronic device is structured and disposed for processing the digital data to convert the sensed vibrations into text that replicates words spoken by the user when the vibrations were generated in the user's oral cavity.

6. A method for personal user recognition, said method comprising of steps of:
   fixing an oral implant device within a user's oral cavity;
   sensing vibrations within the user's oral cavity when the user speaks;
   converting the sensed vibrations into digital vibration data;
   transmitting said digital vibration data externally of the oral cavity in wireless signals;
   transmitting a user identifying code with said wireless signals;
   receiving the wireless signals containing said digital vibration data along with the user identifying code transmitted by one or more of a plurality of said oral implant devices for identifying each user;
   reading said digital vibration data along with the code identifying the user transmitted by one or more of said plurality of oral implant devices for identifying each user;
   converting said digital vibration data of each identified user into text that replicates and distinguishes the words spoken by each identified user;
   comparing said digital vibration data to a known authorized user voice signature for confirming that the user is an authorized user;
   recognizing and applying the converted text for performing operational functions if said digital vibration data matches the authorized user voice signature; and
   ignoring the converted text if said digital vibration data does not match the authorized user voice signature.

7. The method as recited in claim 6 further comprising the step of:
   producing a document using the text converted from said digital vibration data.

8. The method as recited in claim 6 further comprising the step of:
   entering said text converted from said digital vibration data as an input command for operating a device.

* * * * *